Nov. 5, 1968      K. R. MILLS      3,409,587
ANTIOXIDANT SYSTEM FOR POLYOLEFINS
Filed Aug. 5, 1966      2 Sheets-Sheet 1

INVENTOR
K. R. MILLS
BY *Young and Quigg*
ATTORNEYS

INVENTOR
K. R. MILLS
BY Young and Quigg
ATTORNEYS

United States Patent Office 3,409,587
Patented Nov. 5, 1968

3,409,587
ANTIOXIDANT SYSTEM FOR POLYOLEFINS
Kenneth R. Mills, Bartlesville, Okla., assignor to Phillips Petroleum Company, a corporation of Delaware
Continuation-in-part of application Ser. No. 516,349, Dec. 27, 1965. This application Aug. 5, 1966, Ser. No. 570,458
10 Claims. (Cl. 260—45.85)

ABSTRACT OF THE DISCLOSURE

A polymer stabilizer system comprising an organic phosphite compound such as dioctyl phosphite; a thiol ester such as dilaurylthiodipropionate; 2,6-di-tert-butyl-4-methylphenol; and one of 1,1,3-tris(2-methyl-4-hydroxy-5-tert-butylphenyl)butane and tetrakis [3-(3,5-di-tert-butyl-4-hydroxyphenyl)propionyloxymethyl]methane.

---

Figure 1:
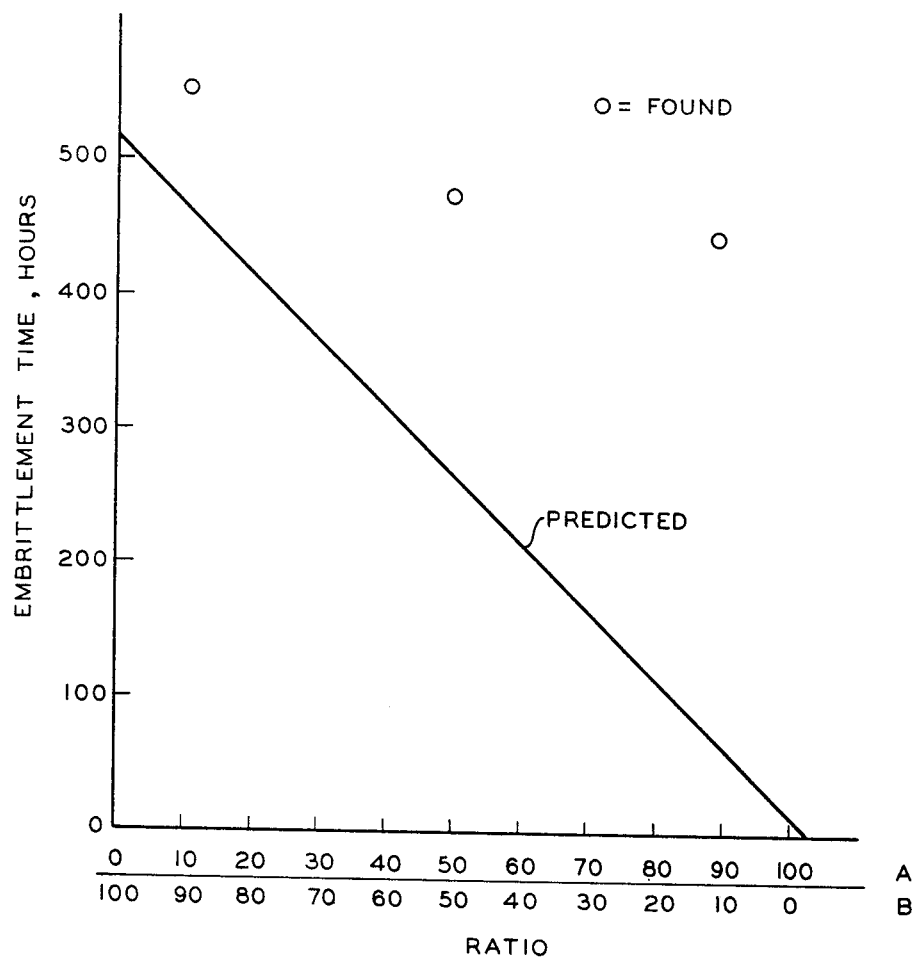

This is a continuation-in-part application of an application bearing Ser. No. 516,349, filed Dec. 27, 1965 now abandoned.

This invention relates to a stibilizer combination useful in the stabilization of polymers of 1-olefins having 2 to 8 carbon atoms against deterioration in physical properties as a result of exposure to light and air, particularly at elevated temperatures and over long periods of time. One aspect of this invention relates to a stibilizer composition useful in stabilizing polypropylene compositions.

It is to be understood that the term "polymers of 1-olefins" used hereinafter in the specification and the claims includes copolymers, terpolymers and quaternary polymers of these 1-olefins. These polymers can also contain not more than 8 to 10 percent of other copolymerizable monomers.

Polypropylene is a tough, high-melting polymeric material, but in several respects its stability leaves much to be desired. The polymer shows a tendency to decrease rapidly in melt viscosity and then to become brittle when kept at elevated temperatures for the time required in milling and calendering, or in extruding, injection molding, or fiber forming equipment. This deterioration is particularly serious when the polymer is worked in the molten state in the presence of oxygen, e.g. air. Shaped polymers prepared in such equipment show a tendency to discolor, to crack, and to powder around the edges upon exposure to sunlight. When the polymer or shaped polymer is heated at elevated temperatures, really an accelerated aging process, the problem is especially accentuated.

To meet commercial requirements, it is of course quite important that the polymer retain its physical properties during processing and thereafter. However, the art has experienced great difficulty in achieving the necessary stabilization. In all probability the changes leading to this deterioration in physical properties arise from chemical modification of the polymer. Whether this modification is due to oxidation or to some other effect is not yet known. Lack of such knowledge has naturally hindered the development of satisfactory stabilizers.

Considerable research over the past few years to solve these problems of deterioration has led to the suggestion of a variety of stabilizers to counteract one or more of these difficulties. Most polypropylene on the market today contains one of these stabilizers. However, no stabilizer or combination of stabilizers has yet been disclosed which is capable of coping with all of the stabilization problems. While it is now possible to stabilize polypropylene fairly well against deterioration in melt viscosity, this stabilization is not always accompanied by an inhibition of deterioration in other respects, such as embrittlement and discoloration at elevated temperatures. Stabilizers which can cope with embrittlement are not capable of preventing discoloration, or reduction in melt viscosity. In addition the retention of the polymer's physical properties over long periods of time is particularly difficult to achieve.

Logically, it would seem that if one stabilizer does not do the entire job, a combination should. Groups of stabilizers, called "stabilizer systems" have been proposed; however, the effect of a plurality of stabilizers is impossible to predict from their effects individually, because the possible effects multiply with the number of stabilizers in the system. A stabilizer to be effective at all must be a reactive substance and stabilizers can react with each other as well as with polypropylene and with whatever leads to the deterioration. The various stabilizers thus can and do introduce unpredictable and undesirable side effects by reactions between themselves, and stabilizers which are capable of improving resistance to deterioration in some ways when combined, may actually offset that individual effect and increase the rate of deterioration in that or in other respects. This may be due to one stabilizer effecting the desired improvement, another stabilizer reacting with and removing the first, and the reaction products accelerating the deterioration. Under such circumstances, developing a stabilizer system which is capable of producing a polypropylene that has a good overall resistance to all of the deteriorative tendencies is obviously quite a complex problem.

In accordance with this instant invention, a stabilizer system is provided which not only improves the resistance of the polymer to discoloration but also improves the resistance of the polymer to embrittlement upon exposure to air and light at normal atmospheric and at elevated temperatures, particularly over long periods of time.

In a copending application, Ser. No. 266,012, assigned to a common assignee, Phillips Petroleum Company, now U.S. Patent 3,349,058, issued Oct. 24, 1967 and in which the present applicant, Kenneth R. Mills, is the coapplicant along with Arthur A. Harban, there is disclosed a stabilizer system which comprises a combination of three stabilizers. a phenolic material, an organic phosphite and a thioester. This stabilizer system prevents the formation of voids in films or filaments of a polymer of a monoolefin.

It has now been surprisingly discovered that if a stabilizer system comprises an organic phosphite compound, a thioester, a specific phenolic material and a second specific phenolic material, that this system has a stabilizing action distinctly superior to that which could be expected from the sum of the actions of the various components taken alone. The employment of the two phenolic compounds in combination produces this unexpected result.

Therefore, it is an object of this invention to provide a novel stabilizer system comprising an organic phosphite, a thioester, 2,6-di-tert-butyl-4-methylphenol and a second specific phenolic compound selected from the group consisting of 1,1,3-tris(2-methyl-4-hydroxy-5-tert-butylphenyl)butane and tetrakis[3 - (3,5 - di-tert-butyl-4-hydroxyphenyl)propionyloxymethyl]methane.

Another object of this invention is to provide a stabilized polymer of a 1-olefin having from 2 to 8 carbon atoms by incorporating therewith a stabilizer system comprising dioctyl phosphite, dilaurylthiodipropionate, 2,6-di-tert-butyl-4-methylphenol and a second specific phenolic compound selected from the group consisting of 1,1,3-tris (2 - methyl-4-hydroxy-5-tert-butylphenyl)butane and the tetrakis[3 - (3,5 - di - tert - butyl - 4 - hydroxyphenyl) propionyloxymethyl]methane.

Figure 2:
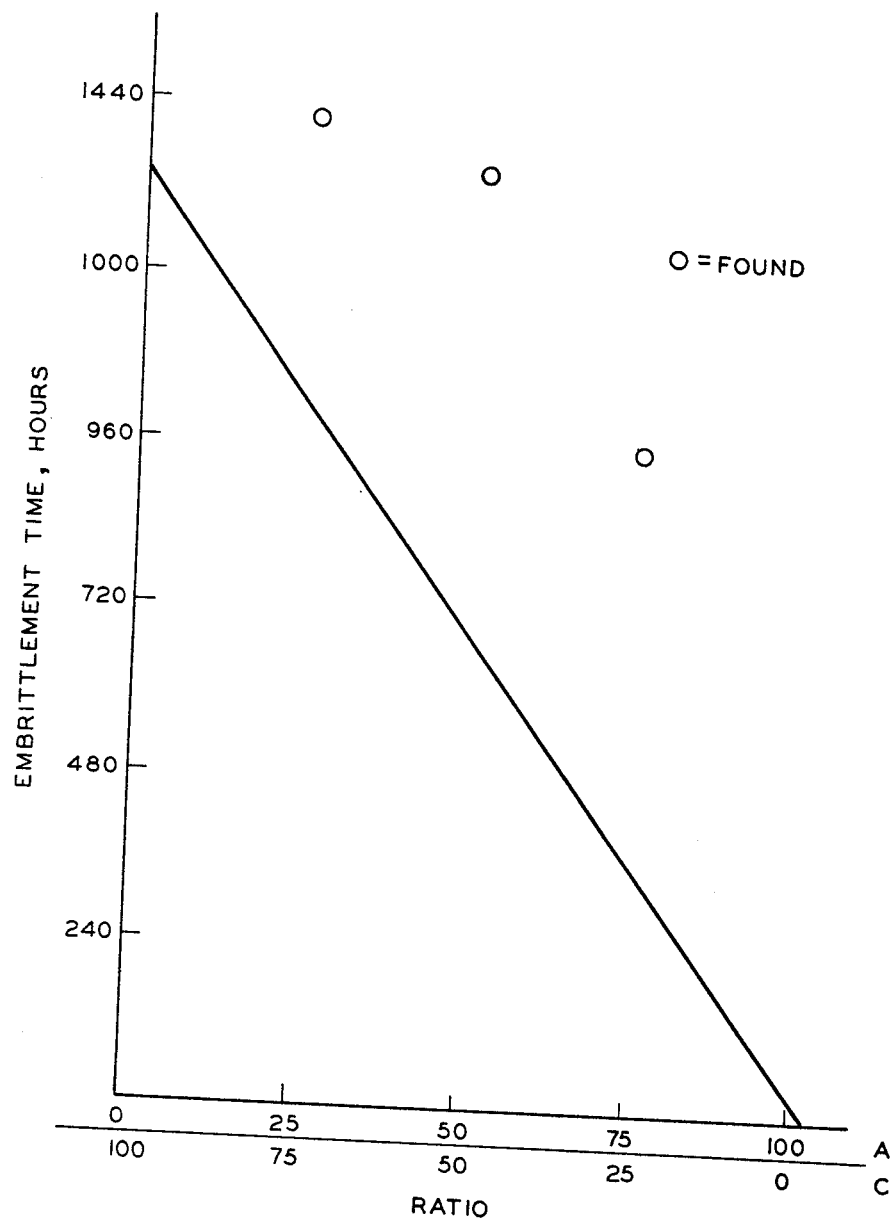

Other objects and many of the attendant advantages of this invention will be readily appreciated as the same becomes better understood by reference to the following detailed description which is considered in connection with the accompanying drawing wherein:

FIGURE 1 graphically illustrates the synergistic effect obtained in stabilizing a 1-olefin polymer against embrittlement by using as the second specific phenolic compound, 1,1,3 - tris(2-methyl-4-hydroxy-5-tert-butylphenyl)-butane designated by the letter B;

FIGURE 2 graphically illustrates the synergistic effect obtained in stabilizing a 1-olefin polymer against embrittlement by using as the second specific phenolic compound tetrakis[3-(3,5-di-tert-butyl-4-hydroxyphenyl)propionyloxymethyl]methane designated by the letter C.

Broadly this invention comprises a process for stabilizing a polymer of a 1-olefin containing from 2 to 8 carbon atoms against deterioration, said process comprising the step of contacting said polymer with a stabilizing system comprising a phosphite ester characterized by the structural formula:

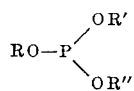

wherein R is a hydrocarbon radical selected from the group consisting of alkyl, aryl, cycloalkyl, and combinations thereof such as alkaryl and aralkyl, having 1 to 20 carbon atoms, and R' and R" are selected from the group consisting of R and hydrogen; a thioester characterized by the structural formula:

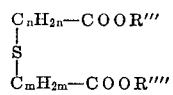

wherein R''' and R'''' are alkyl groups containing 6 to 24 carbon atoms, and $n$ and $m$ are integers from 1 to 6, preferably 2; 2,6-di-tert-butyl-4-methylphenol and a second specific phenol selected from the group consisting of 1,1,3 - tris(2-methyl-4-hydroxy-5-tert-butylphenyl)butane and tetrakis[3 - (3,5 - di-tert-butyl-4-hydroxyphenyl)propionyloxymethyl]methane.

Exemplary organic phosphite esters are: monomethyl phosphite, trimethyl phosphite, trieicosyl phosphite, di-2-ethylhexyl phosphite, diphenyl 2-ethylhexyl phosphite, dibutyl phosphite, di-isooctyl tolyl phosphite, tri-2-ethylhexyl phosphite, phenyl dicyclohexyl phosphite, phenyl diethyl phosphite, triphenyl phosphite, octyl phosphite, isobutyl phosphite, tricresyl phosphite, tri(2,3-dimethylphenyl) phosphite, trioctadecyl phosphite, phenyl phosphite, dioctyl phosphite (DOPI), triisoctyl phosphite, tridodecyl phosphite, isooctyl diphenyl phosphite, diisooctyl phenyl phosphite, tri(2-octylphenyl) phosphite, tri(3-nonylphenyl) phosphite, dicyclohexyl phosphite, benzyl methyl isopropyl phosphite, butyl dicresyl phosphite, isooctyl di(2-octylphenyl) phosphite, di(2-ethylhexyl) 3-isooctylphenyl phosphite, tri(2-cyclohexylphenyl) phosphite, tri - 2 - naphthyl phosphite, tri(3 - phenylphenyl) phosphite, tri(2-phenylethyl) phosphite, tridodecyl phosphite, tri-4-tert-butylphenyl phosphite, dodecyl diphenyl phosphite and 4-tert-butylphenyl di-2-ethylhexyl phosphite.

Exemplary thioester compounds are: laurylhexylthiodipropionate, dilaurylthiodiproprionate (DLTDP), butylstearylthiodipropionate, 2-ethylhexyllaurylthiodipropionate, di-2-ethylhexylthiodipropionate, diisodecylthiodipropionate, isodecyltetradecylthiodiheptanoate, laurylstearylthiodipropionate, distearylthiodipropionate, hexyltetracosylthiodiacetate, octyltetradecylthiodibutyrate, heptyl- heptadecylthiodiheptanoate, the 1-lauryl-8-stearyl diester of 4-thiaoctanedioic acid, the 1-hexyl-10-tetracosyl diester of 3-thiadecanedioic acid, and the like.

A sufficient amount of the stabilizer combination is used to improve the stability of the polymer against deterioration in physical properties, including discoloration and embrittlement, under the conditions to which the polymer, i.e. polypropylene, will be subjected. Very small amounts are usually adequate. Amounts within the range from about 0.15 to 3.50, preferably 0.5 to 2.5 parts by weight of the stabilizer composition per 100 parts of polymer (p.h.p.) are employed for optimum stabilization.

Preferably, the stabilizer system comprises from about 0.025 to about 0.5 p.h.p. each of 2,6-di-tert-butyl-4-methylphenol and either 1,1,3-tris(2-methyl-4-hydroxy-5-tert-butylphenyl)butane or tetrakis[3 - (3,5-di-tert-butyl-4-hydroxyphenyl)propionyloxymethyl]methane, from about 0.05 to about 1.25 p.h.p. of the phosphite ester, and from about 0.05 to about 1.25 p.h.p. of the thioester.

The stabilizer system of the subject invention can be formulated as a simple mixture for incorporation in the polymer. An inert organic solvent can be used to facilitate handling, if the ingredients do not form a homogeneous mixture or solution. Incorporation into the polymer can be by simple blending, by spraying of a solution of the stabilizers on the polymer followed by drying, or by other means known to the industry.

The poly-1-olefines with which the stabilizer system of the invention can be used are any of those known to the industry, and can be made, for example, by the so-called high-pressure process, by the low-pressure process of U.S. 2,825,721, or by the use of any of the known organometal catalyst systems. Examples of other copolymerizable monomers which can be present in the copolymer are butadiene, vinyl acetate, isoprene and the like. It is also within the scope of the invention to add other materials to the mixture of polyolefin and stabilizer e.g., plasticizing agents, lubricants, dyes, fillers, pigments, antistatic agents, and the like.

The stabilizing effect of this stabilizer system on polypropylene was evaluated in the following examples and is graphically demonstrated in FIGURES 1 and 2 wherein FIGURE 1 is based on the data of Example I and FIGURE 2 is based on the data of Example II.

By examination of the straight line connecting the embrittlement times for runs 1 and 5 in FIGURE 1, it will be seen that for any concentration there is a synergistic improvement obtained by the use of 2,6-di-tert-butyl-4-methylphenol (A) and 1,1,3-tris(2-methyl-4-hydroxy-5-tert-butylphenyl)butane (B) in combination with a phosphite ester and a thioester. Similarly, by examination of the straight line connecting the embrittlement times for runs 6 and 10 in FIGURE 2, it will be seen that for any concentration there is a synergistic improvement obtained by the use of 2,6-di-tert-butyl-4-methylphenol (A) and tetrakis[3 - (3,5-di-tert-butyl-4-hydroxyphenyl)propionyloxymethyl]methane (C) in combination with a phosphite ester and a thioester. The designations of A, B and C are employed because the number of letters in the names of the phenolic components makes it difficult to represent on the drawing.

Example I

Polypropylene prepared by mass polymerization of propylene in the presence of a catalyst system comprising diethylaluminum chloride and the reaction product of titanium tetrachloride and aluminum having the approximate formula $TiCl_3 \cdot 1/3 \, AlCl_3$ was treated with the four-component stabilizer system of this invention, and with three-component systems using only one of the phenolic antioxidants. The stabilizer components were dissolved in acetone and this solution was mixed with polypropylene fluff to form a homogeneous slurry. The solvent was evaporated and the polypropylene was compression-molded into films 20 mils thick.

| | P.h.p. Added to Polypropylene [a] | | Embrittlement Time, hr. [b] | |
|---|---|---|---|---|
| | (B) | (A) | Found | Expected |
| Run No.: | | | | |
| 1 | 0.45 | 0.00 | 510 | |
| 2 | 0.40 | 0.05 | 540 | 455 |
| 3 | 0.22 | 0.22 | 475 | 258 |
| 4 | 0.05 | 0.40 | 440 | 62 |
| 5 | 0.00 | 0.45 | 6 | |

[a] All samples also contained 0.9 p.h.p. dilaurylthiodipropionate and 0.1 p.h.p. dioctyl phosphite. P.h.p., parts by weight per 100 parts of polymer.

[b] Five specimens were cut from a compression-molded film 20 mils thick and were aged in an air circulating oven at 150° C. These specimens were checked periodically for failure as indicated by the appearance of spot granulation, usually accompanied by discoloration. The average failure time for the five samples was reported as the embrittlement time.

EXAMPLE II

Another sample of polypropylene as prepared in Example I was tested with a stabilizing system which included as the phenolic constituents 2,6-di-tert-butyl-4-methylphenol (A) and tetrakis[3-(3,5-di-tert-butyl-4-hydroxyphenyl)propionyloxymethyl]methane (C):

| | P.h.p. Added to Polypropylene [a] | | Embrittlement Time, hours | |
|---|---|---|---|---|
| | (C) | (A) | Found | Expected |
| Run No.: | | | | |
| 6 | 0.00 | 0.20 | 24 | |
| 7 | 0.05 | 0.15 | 960 | 360 |
| 8 | 0.10 | 0.10 | 1,344 | 684 |
| 9 | 0.15 | 0.05 | 1,416 | 1,032 |
| 10 | 0.20 | 0.00 | 1,344 | |

[a] All samples also contained 0.4 p.h.p. dilaurylthiodipropionate and 0.05 p.h.p. dioctyl phosphite (p.h.p.=parts by weight per 100 parts of polymer).

Obviously many more modifications and variations of the present invention are possible in the light of the above teachings. It is therefore to be understood that within the scope of the appended claims the invention can be practiced otherwise than as specifically described herein.

What is claimed is:

1. A stabilizer system for use in improving the resistance of polymers formed from 1-olefins having 2 to 8 carbon atoms therein to deterioration in physical properties on exposure to light and heat, comprising (1) an organic phosphite ester characterized by the following formula:

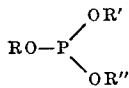

wherein R is a hydrocarbon radical selected from the group consisting of alkyl, aryl, cycloalkyl, alkaryl and aralkyl having 1 to 20 carbon atoms, and R' and R" are selected from the group consisting of R and hydrogen; (2) a thioester characterized by the formula:

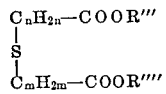

wherein R''' and R'''' are alkyl groups selected from those containing 6 to 24 carbon atoms, and $n$ and $m$ are integers from 1 to 6; (3) 2,6-di-tert-butyl-4-methylphenol; and (4) tetrakis[3 - (3,5 - di-tert-butyl-4-hydroxyphenyl)propionyloxymethyl]methane.

2. A stabilizer system in accordance with claim 1 wherein (3) and (4) are each present in an amount which provides in the polymer a range of from about 0.025 to about 0.5 part by weight per 100 parts of polymer, (1) is present in an amount which provides in the polymer a range of from about 0.05 to about 1.25 parts by weight per 100 parts of polymer, and (2) is present in an amount which provides in the polymer a range of from about 0.05 to about 1.25 parts by weight per 100 parts of polymer.

3. A stabilizer system in accordance with claim 2 in which (1) is dioctyl phosphite and (2) is dilaurylthiodipropionate.

4. A composition having improved resistance to discoloration and embrittlement on aging and heating comprising a polymer formed from monomers selected from the group consisting of 1-olefins having 2 to 8 carbon atoms in combination with a stabilzer system comprising (1) an organic phosphite ester characterized by the following formula:

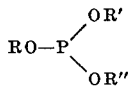

wherein R is a hydrocarbon radical selected from the group consisting of alkyl, aryl, cycloalkyl, alkaryl and aralkyl having 1 to 20 carbon atoms, and R' and R" are selected from the group consisting of R and hydrogen; (2) a thioester characterized by the formula:

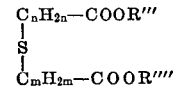

wherein R''' and R'''' are alkyl groups selected from those containing 6 to 24 carbon atoms, and $n$ and $m$ are integers from 1 to 6; (3) 2,6-di-tert-butyl-4-methylphenol; and (4) tetrakis[3-(3,5 - di-tert-butyl - 4 - hydroxyphenyl)propionyloxymethyl]methane.

5. A composition according to claim 4 wherein the polymer is polypropylene, (3) and (4) are each present in a range of from about 0.025 to about 0.5 parts by weight per 100 parts of polymer, (1) is present in the range of from about 0.05 to about 1.25 parts by weight per 100 parts of polymer, and (2) is present in the range of from about 0.05 to about 1.25 parts by weight per 100 parts of polymer.

6. A composition according to claim 5 wherein (1) is dioctyl phosphite and (2) is dilaurylthiodipropionate and said stabilizer system is present in the range of from about 0.15 to about 3.50 parts by weight of the stabilizer system per 100 parts of polypropylene.

7. A stabilizer system for use in improving the resistence of polypropylene to deterioration in physical properties on exposure to light and heat, comprising (1) dioctyl phosphite; (2) dilaurylthiodipropionate; (3) 2,6-di-tert-butyl-4-methylphenol; and (4) 1,1,3-tris(2-methyl-4-hydroxy-5-tert-butylphenyl)butane.

8. A stabilizer system according to claim 7 wherein (3) and (4) are each present in an amount which provides in the polymer a range of from about 0.025 to about 0.5 part by weight per 100 parts of polymer, (1) is present in an amount which provides in the polymer a range of from about 0.05 to about 1.25 parts by weight per 100 parts of polymer, and (2) is present in an amount which provides in the polymer a range of from about 0.05 to about 1.25 parts by weight per 100 parts of polymer.

9. A composition having improved resistance to discoloration and embrittlement on aging and heating comprising polypropylene in combination with a stabilizer system comprising (1) dioctyl phosphite; (2) dilaurylthiodipropionate; (3) 2,6 - di-tert-butyl-4-methylphenol; and (4) 1,1,3-tris(2 - methyl - 4 - hydroxy-5-tert-butylphenyl) butane.

10. A composition according to claim 9 wherein (3) and (4) are each present in the range of from about 0.025 to about 0.5 part by weight per 100 parts of polymer, (1) is present in the range of from about 0.05 to about 1.25 parts by weight per 100 parts of polymer, and (2) is present in the range of from about 0.05 to about 1.25 parts by weight per 100 parts of polymer, and said stabilizer system is present in the range of from about 0.15 to about 3.50 parts by weight of the stabilizer system per 100 parts of polypropylene.

References Cited

FOREIGN PATENTS 638,674  3/1962  Canada.

OTHER REFERENCES

Technical Bulletin 193 "Topanol CA" Apr. 23, 1963, I.C.I Organics, Inc. Imperial Chemical Industries, Limited.

DONALD E. CZAJA, *Primary Examiner.*

V. P. HOKE, *Assistant Examiner.*